US012403916B2

(12) United States Patent
Jeoung

(10) Patent No.: US 12,403,916 B2
(45) Date of Patent: Sep. 2, 2025

(54) AUTO HOLD CONTROL APPARATUS AND AUTO HOLD CONTROL METHOD

(71) Applicants: Hyundai Motor Company, Seoul (KR); Kia Corporation, Seoul (KR)

(72) Inventor: Dong Won Jeoung, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 315 days.

(21) Appl. No.: 18/130,762

(22) Filed: Apr. 4, 2023

(65) Prior Publication Data

US 2024/0199036 A1 Jun. 20, 2024

(30) Foreign Application Priority Data

Dec. 14, 2022 (KR) .......................... 10-2022-0175201

(51) Int. Cl.
*B60W 50/00* (2006.01)
*B60W 30/18* (2012.01)

(52) U.S. Cl.
CPC .. *B60W 50/0097* (2013.01); *B60W 30/18009* (2013.01); *B60W 2520/105* (2013.01); *B60W 2720/106* (2013.01)

(58) Field of Classification Search
None
See application file for complete search history.

(56) References Cited

U.S. PATENT DOCUMENTS

2014/0142828 A1* 5/2014 Harada ................. B60T 13/146
701/70
2021/0039613 A1* 2/2021 Kakeshita ....... B60W 30/18027

FOREIGN PATENT DOCUMENTS

KR 10-1745249 B 6/2017

* cited by examiner

*Primary Examiner* — Amelia Vorce
(74) *Attorney, Agent, or Firm* — Morgan, Lewis & Bockius LLP

(57) ABSTRACT

An auto hold control apparatus obtains a driving signal for releasing an auto hold of the vehicle, through a driver, and generates driving power through the driver, based on the driving signal. The apparatus determines a movement standard deviation of an acceleration generated by the driving power from a first time point to a second time point, generate learning amount related to generated driving power, a generated driving power inclination, a driving power generation time point, or a combination thereof, based on a magnitude of the movement standard deviation, when the movement standard deviation is a threshold value or more than the threshold value. The apparatus generates a predicted learning value by adding the learning amount to a learning value which is stored in the memory in advance, and store the predicted learning value in a memory as a final learning value when the predicted learning value satisfies a predetermined condition.

20 Claims, 8 Drawing Sheets

AUTO HOLD CONTROL APPARATUS AND AUTO HOLD CONTROL METHOD

CROSS-REFERENCE TO RELATED APPLICATION

The present application claims priority to Korean Patent Application No. 10-2022-0175201, filed on Dec. 14, 2022, the entire contents of which is incorporated herein for all purposes by this reference.

BACKGROUND OF THE PRESENT DISCLOSURE

Field of the Present Disclosure

The present disclosure relates to an auto hold control apparatus and an auto hold control method, and more particularly, to a technology of adaptively changing a parameter related to driving power so that neither a stop feeling nor a connection occurs in a situation, in which a vehicle releases an auto hold.

Description of Related Art

Various control processes have been developed to enhance a sense of driving. For example, various correction processes for a technology for maintaining a stop state by use of an auto hold function even when no pressure is applied to a brake pedal and releasing the auto hold when a specific condition (e.g., a pressure to an accelerator pedal) is satisfied.

The auto hold may be defined as an auto vehicle hold (AVH). The auto hold may include a technology of maintaining a stop state of a vehicle by maintaining a braking pressure for at least one tire by use of at least one component related to an electronic stability control included in the vehicle.

When a user applies a pressure to the accelerator pedal while the auto hold is operated, the auto hold may be released, and an acceleration may be generated by driving power generated based on a magnitude of the pressure to the accelerator pedal.

However, due to the input to the accelerator pedal, a braking force due to the auto hold decreases in a process of generating the driving power, and when the generation flows of the driving power and the decrease flows of the braking force are not properly matched with each other, the user may feel inconvenient, for example, due to sense of stop, jittering, or connection.

As a time point, at which the braking force is completely eliminated, is earlier than a time point, at which the driving power is generated, more stop feelings and connections may occur whereby a sense of driving becomes unstable.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an auto hold control apparatus and an auto hold control method, by which a learning value for changing at least one parameter related to generation of driving power may be generated by generating the learning value based on a movement standard deviation of accelerations generated by the driving power.

Another aspect of the present disclosure provides an auto hold control apparatus and an auto hold control method, by which a learning value for decreasing an amount or an inclination of generated driving power is generated in inverse proportion to a magnitude of a movement standard deviation.

Another aspect of the present disclosure provides an auto hold control apparatus and an auto hold control method, by which a learning value for delaying a generation time point of driving power is generated in proportion to a magnitude of a movement standard deviation.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an auto hold control apparatus includes a driver including at least one driving device configured for driving a vehicle, a memory that stores one or more instructions, and a controller operatively connected to the driver and the memory, and the auto hold control apparatus may be configured to, when the instructions are executed by the controller, obtain a driving signal for releasing an auto hold of the vehicle, through the driver, generate driving power through the driver, based on the driving signal, determine a movement standard deviation of an acceleration generated by the driving power from a first time point to a second time point, generate at least one learning amount related to at least one of the generated driving power, a generated driving power inclination, a driving power generation time point, or a combination thereof, based on a magnitude of the movement standard deviation, when the movement standard deviation is a threshold value or more than the threshold value, generate a predicted learning value by adding the at least one learning amount to a learning value which is stored in the memory in advance, and store the predicted learning value in the memory as a final learning value when the predicted learning value satisfies a predetermined condition.

According to an exemplary embodiment of the present disclosure, the auto hold control apparatus may be configured to, when the instructions are executed by the controller, store a preset learning value in the memory as the final learning value when the predicted learning value does not satisfy the predetermined condition.

According to an exemplary embodiment of the present disclosure, the auto hold control apparatus may be configured to, when the instructions are executed by the controller, generate the at least one learning amount for decreasing at least one of the generated driving power, the generated driving power inclination, or a combination thereof so that the at least one learning amount is inversely proportional to the magnitude of the movement standard deviation when the movement standard deviation is the threshold value or more, and generate the predicted learning value including a first learning amount generated by adding the at least one learning amount to the at least one of the initially generated driving power learning amount, an initially generated driving power inclination learning amount, or a combination thereof.

According to an exemplary embodiment of the present disclosure, the auto hold control apparatus may be configured to, when the instructions are executed by the controller, store the predicted learning value including the first learning amount in the memory as the final learning value when the first learning amount is a predetermined minimum value or more than the predetermined minimum value, and change the first learning amount included in the predicted learning value to the predetermined minimum value and then store the first learning amount in the memory as the final learning value when the first learning amount is less than the predetermined minimum value.

According to an exemplary embodiment of the present disclosure, the auto hold control apparatus may be configured to, when the instructions are executed by the controller, generate the at least one learning amount for delaying the driving power generation time point so that the at least one learning amount is proportional to the magnitude of the movement standard deviation when the movement standard deviation is the threshold value or more, and generate the predicted learning value including a second learning amount generated by adding the at least one learning amount to an initial driving power generation time point learning amount included in the learning value which is stored in advance.

According to an exemplary embodiment of the present disclosure, the auto hold control apparatus may be configured to, when the instructions are executed by the controller, store the predicted learning value including the second learning amount in the memory as the final learning value when the second learning amount is less than a predetermined maximum value, and change the second learning amount included in the predicted learning value to the predetermined maximum value and then store the second learning amount in the memory as the final learning value when the second learning amount is the predetermined maximum value or more than the predetermined maximum value.

According to an exemplary embodiment of the present disclosure, the auto hold control apparatus may be configured to, when the instructions are executed by the controller, monitor the movement standard deviation while controlling an auto hold function of the vehicle based on the final learning value, when it is identified that the movement standard deviation corresponds to the threshold value or less than the threshold value continuously by a predetermined number of times or more the predetermined number of times, generate a corrected first learning amount by adding a predetermined first compensation value to a first learning amount related to at least one of the generated driving power, the generated driving power inclination, or a combination thereof, and generate a corrected second learning amount by subtracting a predetermined second compensation value from a second learning amount related to the driving power generation time point.

According to an exemplary embodiment of the present disclosure, the auto hold control apparatus may be configured to, when the instructions are executed by the controller, initialize a first final learning amount related to one of the generated driving power, the generated driving power inclination, or a combination thereof included in the final learning value and store the initialized first final learning amount in the memory when the corrected first learning amount is a positive number.

According to an exemplary embodiment of the present disclosure, the auto hold control apparatus may be configured to, when the instructions are executed by the controller, initialize a second final learning amount related to the driving power generation time point included in the final learning value and store the initialized second final learning amount in the memory when the corrected second learning amount is a negative number.

According to an exemplary embodiment of the present disclosure, the auto hold control apparatus may further include a display, the auto hold control apparatus may be configured to, when the instructions are executed by the controller, monitor the final learning value, based on a predetermined period, and display operation information of the auto hold control apparatus on the display when it is identified in a monitoring result that the final learning value satisfies a warning condition, and the warning condition includes whether the final learning value is more than a predetermined limit value.

According to an aspect of the present disclosure, an auto hold control method includes obtaining a driving signal for releasing an auto hold of a vehicle through a driver, by a controller, generating driving power through the driver, based on the driving signal, by the controller, determining a movement standard deviation of an acceleration generated by the driving power from a first time point to a second time point, by the controller, generating at least one learning amount related to at least one of the generated driving power, a generated driving power inclination, a driving power generation time point, or a combination thereof, based on a magnitude of the movement standard deviation, when the movement standard deviation is a threshold value or more than the threshold value, by the controller, generating a predicted learning value by adding the at least one learning amount to a learning value which is stored in the memory in advance, by the controller, and storing the predicted learning value in the memory as a final learning value, when the predicted learning value satisfies a predetermined condition, by the controller.

According to an exemplary embodiment of the present disclosure, the storing of the predicted learning value in the memory as the final learning value, when the predicted learning value satisfies the predetermined condition, by the controller may include storing a preset learning value in the memory as the final learning value, when the predicted learning value does not satisfy the predetermined condition, by the controller.

According to an exemplary embodiment of the present disclosure, the generating of the predicted learning value by adding the at least one learning amount to the learning value which is stored in the memory in advance, by the controller may include generating the at least one learning amount for decreasing at least one of the generated driving power, the generated driving power inclination, or a combination thereof so that the at least one learning amount is inversely proportional to the magnitude of the movement standard deviation when the movement standard deviation is the threshold value or more, by the controller, and generating the predicted learning value including a first learning amount generated by adding at least one learning amount to at least one of an initially generated driving power learning amount, an initially generated driving power inclination learning amount, or a combination thereof, by the controller.

According to an exemplary embodiment of the present disclosure, the storing of the predicted learning value in the memory as the final learning value, when the predicted learning value satisfies the predetermined condition, by the controller may include storing the predicted learning value including the first learning amount in the memory as the final learning value when the first learning amount is a predetermined minimum value or more than the predetermined minimum value, by the controller, and changing the first learning amount included in the predicted learning value to the predetermined minimum value and then store the first learning amount in the memory as the final learning value when the first learning amount is less than the predetermined minimum value, by the controller.

According to an exemplary embodiment of the present disclosure, the generating of the predicted learning value by adding the at least one learning amount to the learning value which is stored in the memory in advance, by the controller may include generating the at least one learning amount for delaying the driving power generation time point so that the at least one learning amount is proportional to the magnitude of the movement standard deviation when the movement standard deviation is the threshold value or more, by the controller, and generating the predicted learning value including a second learning amount generated by adding the at least one learning amount to an initial driving power generation time point learning amount included in the learning value which is stored in advance, by the controller.

According to an exemplary embodiment of the present disclosure, the storing of the predicted learning value in the memory as the final learning value, when the predicted learning value satisfies the predetermined condition, by the controller may include storing the predicted learning value including the second learning amount in the memory as the final learning value when the second learning amount is less than a predetermined maximum value, by the controller, and changing the second learning amount included in the predicted learning value to the predetermined maximum value and then storing the second learning amount in the memory as the final learning value when the second learning amount is the predetermined maximum value or more than the predetermined maximum value, by the controller.

According to an exemplary embodiment of the present disclosure, the auto hold control method may include monitoring the movement standard deviation while controlling an auto hold function of the vehicle based on the final learning value, by the controller, when it is identified that the movement standard deviation corresponds to the threshold value or less than the threshold value continuously by a predetermined number of times or more the predetermined number of times, generating a corrected first learning amount by adding a predetermined first compensation value to a first learning amount related to at least one of the generated driving power, the generated driving power inclination, or a combination thereof, by the controller, and generate a corrected second learning amount by subtracting a predetermined second compensation value from a second learning amount related to the driving power generation time point, by the controller.

According to an exemplary embodiment of the present disclosure, the generating of the corrected first learning amount, by the controller may include initializing a first final learning amount related to one of the generated driving power, the generated driving power inclination, or a combination thereof included in the final learning value and storing the initialized first final learning amount in the memory when the corrected first learning amount is a positive number, by the controller.

According to an exemplary embodiment of the present disclosure, the generating of the corrected second learning amount, by the controller may include initializing a second final learning amount related to the driving power generation time point included in the final learning value and storing the initialized second final learning amount in the memory when the corrected second learning amount is negative, by the controller.

According to an exemplary embodiment of the present disclosure, the auto hold control method may include monitoring the final learning value based on a predetermined period, by the controller, and displaying operation information of the auto hold control apparatus on the display when it is identified in a monitoring result that the final learning value satisfies a warning condition, by the controller, and the warning condition may include whether the final learning value is more than a predetermined limit value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

With regard to description of drawings, the same or similar components may be marked by the same or similar reference numerals.

Figure 1:
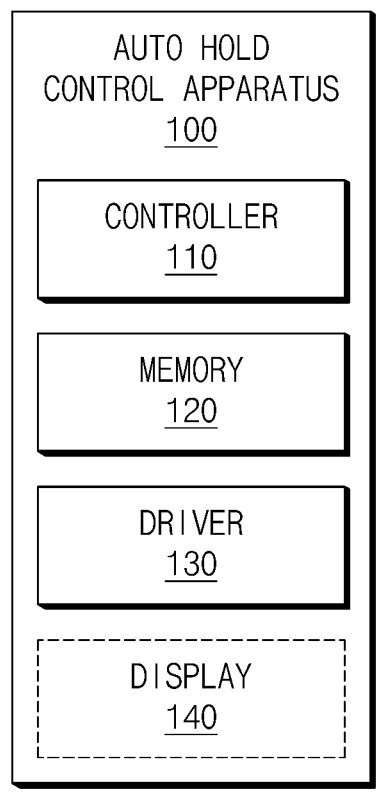
FIG. 1 is a block diagram illustrating components of an auto hold control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. Throughout the specification, it is noted that the same or like reference numerals denote the same or like components even though they are provided in different drawings. Furthermore, in the following description of the present disclosure, a detailed description of known functions and configurations incorporated herein will be omitted when it may make the subject matter of the present disclosure rather unclear.

The terms, such as first, second, A, B, (a), (b) or the like may be used herein when describing components of the present disclosure. The terms are provided only to distinguish the components from other components, and the essences, sequences, orders, and the like of the components are not limited by the terms. Furthermore, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, various embodiments of the present disclosure will be described in detail with reference to FIG. 1, FIG. 2, FIG. 3, FIG. 4, FIG. 5, FIG. 6, FIG. 7, and FIG. 8.

FIG. 1 is a block diagram illustrating components of an auto hold control apparatus according to an exemplary embodiment of the present disclosure.

According to an exemplary embodiment of the present disclosure, an auto hold control apparatus 100 may include at least one of a controller 110, a memory 120, a driver 130, a display 140, or any combination thereof.

According to an exemplary embodiment of the present disclosure, the controller 110 may be operatively connected to the memory 120, the driver 130, and/or the display 140. The controller 110 may control an operation of the memory 120, the driver 130, and/or the display 140.

For example, the controller 110 may control an auto hold function of a vehicle. In an exemplary embodiment of the present disclosure, the controller 110 may maintain a stop state by maintaining a braking pressure on at least one tire of the vehicle even when a pressure input to a brake pedal is not applied in a state, in which the vehicle is stopped.

For example, the controller 110 may obtain a driving signal for releasing an auto hold function of the vehicle through the driver 130 in a situation, in which the auto hold function of the vehicle is performed.

As an exemplary embodiment of the present disclosure, the controller 110 may obtain the driving signal for releasing the auto hold function of the vehicle through the driver 130, based on an input to the driver 130. As an exemplary embodiment of the present disclosure, the input to the driver 130 may include a pressure input of a specific intensity or more to an accelerator pedal included in the driver 130.

For example, the controller 110 may be configured to generate driving power through the driver 130, based on the driving signal.

As an exemplary embodiment of the present disclosure, the controller 110 may be configured to generate driving power for driving the vehicle by use of at least one driving device (e.g., a motor) included in the driver 130, based on the obtained driving signal.

For example, the controller 110 may monitor an acceleration generated by the driving power.

As an exemplary embodiment of the present disclosure, the controller 110 may be configured to determine a movement standard deviation in a specific section of the acceleration generated by the driving power. The controller 110, for example, may be configured to determine an acceleration movement standard deviation from a first time point to a second time point.

For example, the controller 110 may be configured to determine whether the movement standard deviation is a threshold value or more than the threshold value. As an exemplary embodiment of the present disclosure, the threshold value may be a preset setting value. As an exemplary embodiment of the present disclosure, the threshold value may be a setting value which may be changed by users and/or manufacturers.

For example, the controller 110 may be configured to generate at least one learning amount related to at least one of the generated driving power, a generated driving power inclination, a driving power generation time point, or a combination thereof, based on a magnitude of the movement standard deviation, when the movement standard deviation is a threshold value or more than the threshold value.

As an exemplary embodiment of the present disclosure, the controller 110 may be configured to generate the at least one learning amount for decreasing at least one of the generated driving power, the generated driving power inclination, or any combination thereof so that the at least one learning amount is inversely proportional to the magnitude of the movement standard deviation when the movement standard deviation is the threshold value or more. The controller 110, for example, may be configured to generate at least one learning amount which is set so that a decrease in the generated driving power and/or the generated driving power inclination is inversely proportional to the magnitude of the movement standard deviation.

As an exemplary embodiment of the present disclosure, the controller 110 may be configured to generate at least one learning amount for delaying the driving power generation time point in proportion to the magnitude of the movement standard deviation when the movement standard deviation is the threshold value or more. The controller 110, for example, may be configured to generate at least one learning amount which is set so that a delay time of the driving power generation time point is proportional to the magnitude of the movement standard deviation.

For example, the controller 110 may be configured to generate a predicted learning value by adding the generated at least one learning amount to a learning value which is stored in advance.

As an exemplary embodiment of the present disclosure, the controller 110 may be configured to generate a predicted learning value including a first learning amount which is generated by adding the at least one learning amount to at least one of an initially generated driving power learning amount and an initially generated driving power inclination learning amount, which are included in the learning value stored in advance, or any combination thereof.

As an exemplary embodiment of the present disclosure, the controller 110 may be configured to generate a predicted learning value including a second learning amount which is generated by adding at least one learning amount to an initial driving power generation time point learning amount included in a learning value stored in advance.

For example, the controller 110 may set the predicted learning value as a final learning value and store it in the memory 120 when the predicted learning value satisfies a specific condition.

As an exemplary embodiment of the present disclosure, when the first learning amount is a predetermined minimum value or more than the predetermined minimum value, the controller 110 may store the predicted learning value including the first learning amount in the memory 120 as the final learning value.

As an exemplary embodiment of the present disclosure, when the second learning amount is less than a specific maximum value, the controller 110 may store the predicted learning value including the second learning amount in the memory 120 as the final learning value.

For example, the controller 110 may store the preset learning value in the memory as the final learning value when the predicted learning value does not satisfy the specific condition.

As an exemplary embodiment of the present disclosure, when the first learning amount is less than the specific minimum value, the controller 110 may change the first learning amount included in the predicted learning value to a specific minimum value and may store it in the memory 120 as the final learning value.

As an exemplary embodiment of the present disclosure, when the second learning amount is the specific maximum value or more, the controller 110 may change the second learning amount included in the predicted learning value to a specific maximum value and may store it in the memory 120 as the final learning value.

For example, the controller 110 may monitor the movement standard deviation in real time while controlling the auto hold function of the vehicle based on the stored final learning value.

For example, the controller 110 may change the learning amount related to at least one of the generated driving power, the driving power generation inclination, the driving power generation time point, or any combination thereof when it is identified that the movement standard deviation corresponds to the threshold value or less than the threshold value continuously by a specific number of times or more.

For example, the controller 110 may be configured to generate a corrected first learning amount by adding a specific first compensation value to a first learning amount related to at least one of the generated driving power, the generated driving power inclination, or any combination thereof when it is identified that the movement standard deviation corresponds to the threshold value or less than the threshold value continuously by the specific number of times or more.

For example, the controller 110 may be configured to generate a corrected second learning amount by subtracting a specific second compensation value from a second learning amount related to the driving power generation time point when it is identified that the movement standard deviation corresponds to the threshold value or less than the threshold value continuously by the specific number of times or more.

For example, the controller 110 may change or initialize at least some of the learning amounts included in the final learning value based on a sign of the corrected at least one learning amount. An initializing operation of the learning amount, for example, may include an operation of changing a value of the learning amount to 0.

As an exemplary embodiment of the present disclosure, when the corrected first learning amount is a positive number, the controller 110 may initialize a first final learning amount related to one of the generated driving power and the generated driving power inclination, which are included in the final learning value, or any combination thereof, and may store it in the memory 120.

As an exemplary embodiment of the present disclosure, the controller 110 may initialize a second final learning amount related to the driving power generation time point included in the final learning value and store it in the memory 120 when the corrected second learning amount is a negative number.

For example, the controller 110 may display operation information of the auto hold control apparatus 100 by use of the display 140.

As an exemplary embodiment of the present disclosure, the controller 110 may monitor the final learning value based on a specific period, and may display operation information of the auto hold control apparatus 100 on the display 140 when it is identified in a monitoring result that the final learning value satisfies a warning condition. The warning condition, for example, may include whether the final learning value is more than a predetermined limit value. The operation information of the auto hold control apparatus 100, for example, may include information on at least one of an error, a breakdown, a degradation, or any combination of at least some of the components of the auto hold control apparatus 100.

According to an exemplary embodiment of the present disclosure, the memory 120 may store instructions or data. For example, the memory 120 may store instructions that, when being executed by the controller 110, cause the auto hold control apparatus 100 to perform various operations.

For example, the memory 120 and the controller 110 may be implemented as one chipset. The controller 110 may include at least one of a communication processor or a modem.

For example, the memory 120 may store various information associated with the auto hold control apparatus 100. As an exemplary embodiment of the present disclosure, the memory 120 may store information on an operation history of the controller 110. As an exemplary embodiment of the present disclosure, the memory 120 may store information associated with a state and/or an operation of the components (e.g., at least one of an engine control unit (ECU), the controller 110, the driver 130, the display 140, or any combination thereof) of the vehicle.

According to an exemplary embodiment of the present disclosure, the driver 130 may include at least one of an accelerator pedal, a motor, an engine, or any combination thereof.

For example, the driver 130 may accelerate the vehicle by receiving an input (e.g., a pressure input to the accelerator pedal) for accelerating the vehicle, or based on a torque transmitted from the controller 110.

According to an exemplary embodiment of the present disclosure, the display 140 may include at least one display device.

For example, the display 140 may display operation information of the auto hold control apparatus 100, based on control by the controller 110.

Figure 2:
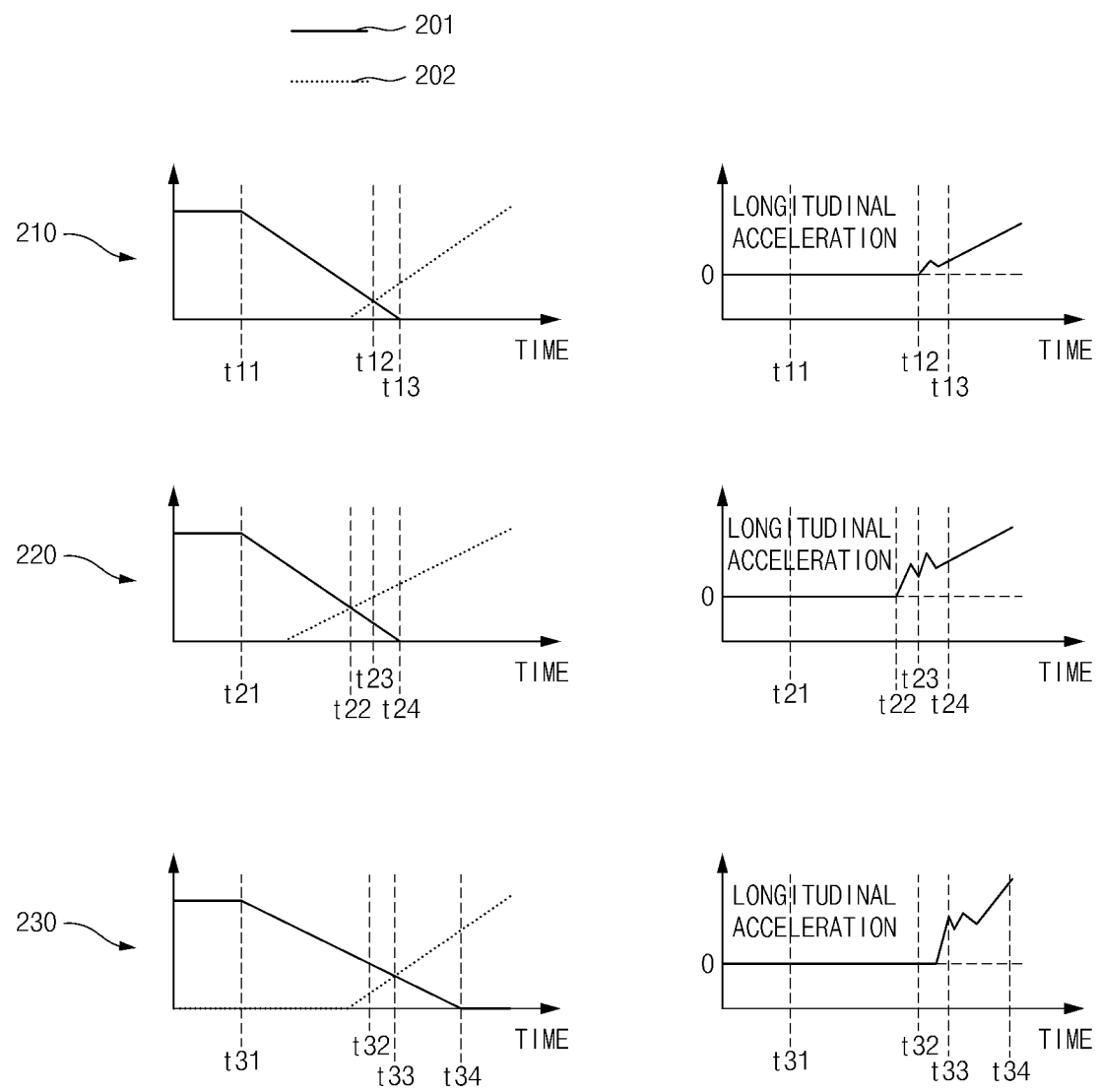
FIG. 2 illustrates a graph depicting a situation of releasing an auto hold function according to an exemplary embodiment of the present disclosure.

FIG. 2 illustrates a graph depicting a situation of releasing the auto hold function according to an exemplary embodiment of the present disclosure.

Referring to FIG. 2, according to an exemplary embodiment of the present disclosure, reference numeral 201 may correspond to a braking force applied to the driver (e.g., the driver 130 of FIG. 1) of the vehicle, and reference numeral 202 may correspond to the driving power generated through the driver of the vehicle. For example, reference numeral 210 may represent an auto hold control operation of the vehicle according to a normal state. For example, reference numerals 220 and 230 may represent a case, in which a stop feeling and/or a connection problem occurs due to the auto hold control operation of the vehicle.

Referring to reference numeral 210, according to an exemplary embodiment of the present disclosure, the auto hold control apparatus (e.g., the auto hold control apparatus 100 of FIG. 1) may accelerate the vehicle based on reception of an acceleration input while the auto hold function is performed.

For example, the auto hold control apparatus may perform an auto hold function till a first time point t11. As an exemplary embodiment of the present disclosure, the auto hold control apparatus may start an operation of releasing the auto hold function at the first time point t11.

For example, the auto hold control apparatus may decrease the braking force till a third time point t13 from the first time point t11. As an exemplary embodiment of the present disclosure, the braking force applied to the vehicle may be eliminated at the third time point t13, based on the control of the auto hold control apparatus.

For example, the auto hold control apparatus may be configured to generate the driving power of the vehicle at one time point between the first time point t11 and a second time point t12. As an exemplary embodiment of the present disclosure, differences between the braking force and the driving power applied to the vehicle at the second time point t12 may become 0 based on the control of the auto hold control apparatus. In other words, an acceleration may be generated by the driving power at the second time point t12.

Referring to reference numeral 220, according to an exemplary embodiment of the present disclosure, the auto hold control apparatus may accelerate the vehicle, based on reception of the acceleration input while the auto hold function is performed.

For example, the auto hold control apparatus may perform the auto hold function till a fourth time point t21. As an exemplary embodiment of the present disclosure, the auto hold control apparatus may start an operation of releasing the auto hold function at the fourth time point t21.

For example, the auto hold control apparatus may decrease the braking force till a seventh time point t24 from the fourth time point t21. As an exemplary embodiment of the present disclosure, the braking force applied to the vehicle may be eliminated at the seventh time point t24, based on the control of the auto hold control apparatus.

For example, the auto hold control apparatus may be configured to generate the driving power of the vehicle at one time point between the fourth time point t21 and a fifth time point t22. As an exemplary embodiment of the present disclosure, differences between the braking force and the driving power applied to the vehicle at the fifth time point t22 may become 0 based on the control of the auto hold control apparatus. In other words, an acceleration may be generated by the driving power at the fifth time point t22.

However, as compared with reference numeral 210, according to reference numeral 220, the driving power of the vehicle may be generated at a relatively early time point, and a stop feeling and/or a connection problem may occur.

For example, as compared with the aspect that the difference between the driving power and the braking force according to reference numeral 210 becomes 0 at the second time point t12, the driving power of the vehicle may be already higher than the braking force at a sixth time point t23 corresponding to the second time point t12. Accordingly, as the movement standard deviation of the acceleration is generated more and/or longer than in reference numeral 210, the stop feeling and/or the connection problem may become severer.

Referring to reference numeral 230, according to an exemplary embodiment of the present disclosure, the auto hold control apparatus may accelerate the vehicle, based on reception of the acceleration input while the auto hold function is performed.

For example, the auto hold control apparatus may perform the auto hold function till an eighth time point t31. As an exemplary embodiment of the present disclosure, the auto hold control apparatus may start an operation of releasing the auto hold function at the eighth time point t31.

For example, the auto hold control apparatus may decrease the braking force till an eleventh time point t34 from the eighth time point t31. As an exemplary embodiment of the present disclosure, the braking force applied to the vehicle may be eliminated at the eleventh time point t34, based on the control of the auto hold control apparatus.

For example, the auto hold control apparatus may be configured to generate the driving power of the vehicle at one time point between the eighth time point t31 and a ninth time point t32. As an exemplary embodiment of the present disclosure, differences between the braking force and the driving power applied to the vehicle at a tenth time point t33 may become 0 based on the control of the auto hold control apparatus. In other words, an acceleration may be generated by the driving power at the tenth time point t33.

However, as compared with reference numeral 210, according to reference numeral 230, the driving power of the vehicle may be released (or eliminated) at a relatively late time point, and a stop feeling and/or a connection problem may occur.

For example, the braking force may be eliminated at the eleventh time point t34 as compared with the aspect that the braking force is eliminated (or becomes 0) at the third time point t13 according to reference numeral 210. Accordingly, as compared with the aspect that the difference between the driving power and the braking force according to reference numeral 210 becomes 0 at the second time point t12, the driving power of the vehicle may be less than the braking force at the ninth time point t32 corresponding to the second time point t12. Accordingly, as the movement standard deviation of the acceleration is generated more and/or longer than in reference numeral 210, the stop feeling and/or the connection problem may become severer.

Figure 3:
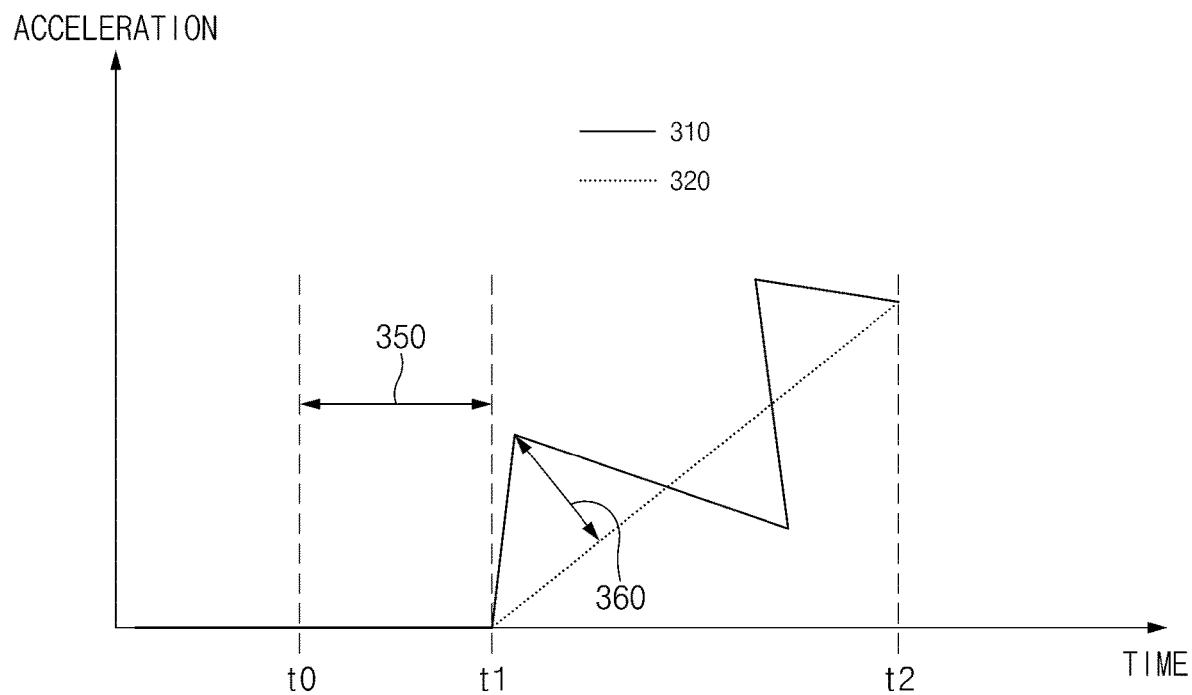
FIG. 3 illustrates a graph, in which an auto hold control apparatus is configured to determine a movement standard deviation, according to an exemplary embodiment of the present disclosure.

FIG. 3 illustrates a graph, in which the auto hold control apparatus is configured to determine the movement standard deviation, according to an exemplary embodiment of the present disclosure.

Referring to FIG. 3, according to an exemplary embodiment of the present disclosure, the auto hold control apparatus (e.g., the auto hold control apparatus 100 of FIG. 1) may be configured to determine a movement standard deviation 360 of the acceleration generated through the driving power. For example, reference numeral 310 may be a graph that depicts an actual acceleration of the vehicle, and reference numeral 360 may be a graph depicting a moving average of the acceleration.

According to an exemplary embodiment of the present disclosure, the auto hold control apparatus may identify a time difference between a reference time point t0 to a first time point t1 as a delay time 350. For example, the reference time point t1 may be a time point, at which the acceleration is generated when the auto hold function is normally performed. For example, in FIG. 3, the delay time 350 may be generated as a problem occurs in the auto hold function and generation of the acceleration is delayed.

According to an exemplary embodiment of the present disclosure, the auto hold control apparatus may be configured to determine the movement standard deviation 360 from the first time point t1, at which the acceleration is generated, to a specific time point (e.g., a second time point t2).

For example, the auto hold control apparatus may identify an actual acceleration of the vehicle from the first time point t1 to the second time point t2, and may be configured to determine an acceleration moving average from the first time point t1 to the second time point t2. The auto hold control apparatus, for example, may be configured to determine the movement standard deviation 360 of the acceleration by subtracting the determined acceleration moving average and the actual acceleration.

For example, the auto hold control apparatus may be configured to determine the movement standard deviation 360 from the first time point t1 to the second time point t2 and compare it with the threshold value.

Figure 4:
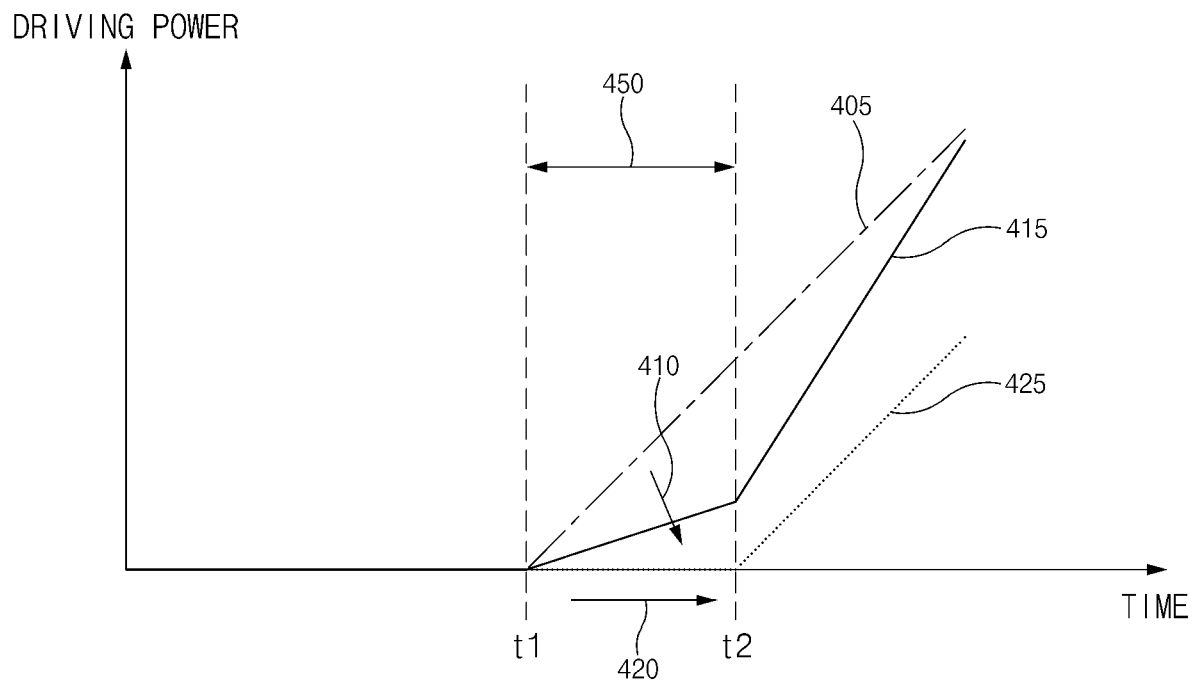
FIG. 4 illustrates a graph related to an operation of changing a parameter related to driving power by an auto hold control apparatus according to an exemplary embodiment of the present disclosure.

FIG. 4 illustrates a graph related to an operation of changing a parameter related to driving power by the auto hold control apparatus according to an exemplary embodiment of the present disclosure.

According to an exemplary embodiment of the present disclosure, the auto hold control apparatus (e.g., the auto hold control apparatus 100 of FIG. 1) may change at least one parameter (e.g., at least one of the generated driving power, the generated driving power inclination, the driving power generation time point, or any combination thereof) related to the driving power.

According to an exemplary embodiment of the present disclosure, the auto hold control apparatus may be configured to generate the driving power through the driver (e.g., the driver 130 of FIG. 1) when obtaining a driving signal for releasing the auto hold while the auto hold function is performed. For example, reference numeral 405 may denote a graph of the driving power which is generated based on the driving signal. For example, the first time point t1 may be a time point, at which the driving power is generated in the vehicle having a problem in the auto hold function (e.g., the auto hold releasing function). For example, the second time point t2 may be a reference time point, at which the driving power is generated in the vehicle of which the auto hold function is normally operated.

According to an exemplary embodiment of the present disclosure, the auto hold control apparatus may renew (or update) the stored learning value related to at least one parameter related to the driving power in the memory (e.g., the memory 120 of FIG. 1) when the movement standard deviation of the acceleration is the threshold value or more.

Referring to reference numeral 410, according to an exemplary embodiment of the present disclosure, the auto hold control apparatus may decrease an amount and/or an inclination of the generated driving power.

For example, the auto hold control apparatus may decrease the generated driving power and/or the generated driving power inclination generated at the first time point t1 as in the graph according to reference numeral 415.

For example, the auto hold control apparatus may be configured to generate the learning amount for decreasing the generated driving power and/or the generated driving power inclination so that the learning amount is inversely proportional to the magnitude of the movement standard deviation.

As an exemplary embodiment of the present disclosure, the auto hold control apparatus may set the generated driving power inclination learning amount to 0 Nm/s when the movement standard deviation is 0 to 0.2.

As an exemplary embodiment of the present disclosure, the auto hold control apparatus may set the generated driving power inclination learning amount to −1 Nm/s when the movement standard deviation is 0.3 to 0.5.

As an exemplary embodiment of the present disclosure, the auto hold control apparatus may set the generated driving power inclination learning amount to −3 Nm/s when the movement standard deviation is 1.

As an exemplary embodiment of the present disclosure, the auto hold control apparatus may set the generated driving power inclination learning amount to −5 Nm/s when the movement standard deviation is 1.5 or more. In other words, a limit value of the generated driving power inclination learning amount according to the magnitude of the movement standard deviation may be −5 Nm/s.

For example, when a first learning amount generated by adding the generated driving power inclination learning amount generated based on the magnitude of the movement standard deviation to the initially generated driving power inclination learning amount included in the learning value stored in the memory is a specific minimum value (e.g., −3 Nm/s), the auto hold control apparatus may set the predicted learning value including the first learning amount as the final learning value and store it in the memory.

For example, when the first learning amount generated by adding the generated driving power inclination learning amount generated based on the magnitude of the movement standard deviation to the initially generated driving power inclination learning amount included in the learning value stored in the memory is less than the specific minimum value, the auto hold control apparatus may change the first learning amount to the specific minimum value, set it as the final learning value, and store it in the memory.

The generated driving power inclination has been described in the above-described embodiments, but the auto hold control apparatus also may be configured to generate the final learning value for the generated driving power in a similar scheme and store it in the memory.

Referring to reference numeral 420, according to an exemplary embodiment of the present disclosure, the auto hold control apparatus may delay a time point, at which the driving power is generated.

For example, the auto hold control apparatus may delay the driving power generation time point from the first time point t1 to the second time point t2 as in the graph according to reference numeral 425.

For example, the auto hold control apparatus may be configured to generate the learning amount for delaying the driving power generation time point so that the learning amount is proportional to the magnitude of the movement standard deviation.

As an exemplary embodiment of the present disclosure, the auto hold control apparatus may set the learning amount for delaying the driving power generation time point to 0 ms when the movement standard deviation is 0 to 0.2

As an exemplary embodiment of the present disclosure, the auto hold control apparatus may set the generated driving power inclination learning amount to 50 m/s when the movement standard deviation is 0.3 to 0.5

As an exemplary embodiment of the present disclosure, the auto hold control apparatus may set the generated driving power inclination learning amount to 100 m/s when the movement standard deviation is 1

As an exemplary embodiment of the present disclosure, the auto hold control apparatus may set the generated driving power inclination learning amount to 200 m/s when the movement standard deviation is 1.5 or more. In other words, a limit value of the driving power generation time point learning amount according to the magnitude of the movement standard deviation may be 200 m/s.

For example, when a second learning amount generated by adding the driving power generation time point learning amount generated based on the magnitude of the movement standard deviation to the initial driving power generation time point learning amount included in the learning value stored in the memory is less than a specific maximum value (e.g., 350 m/s), the auto hold control apparatus may set the predicted learning value including the second learning amount as the final learning value and store it in the memory.

For example, when the second learning amount generated by adding the driving power generation time point learning amount generated based on the magnitude of the movement standard deviation to the initial driving power generation time point learning amount included in the learning value stored in the memory is greater than the specific minimum value, the auto hold control apparatus may change the second learning amount included in the predicted learning value to the specific maximum value, set it as the final learning value, and store it in the memory.

According to an exemplary embodiment of the present disclosure, the auto hold control apparatus may be configured to generate the learning value for changing the above-described two driving power related parameters and may store it in the memory.

According to an exemplary embodiment of the present disclosure, the auto hold control apparatus may perform the above-described two algorithms substantially at the same time or selectively according to settings and/or a specific reference of the user.

The above-described values related to FIG. 4 are exemplary, and the exemplary embodiments of the present disclosure are not limited thereto.

For example, the contents on at least one of the generated learning amount value, the specific minimum value, the specific maximum value, or any combination thereof are exemplary, and may be changed based on the settings of the user or a situation regarding the driving of the vehicle.

Figure 5:
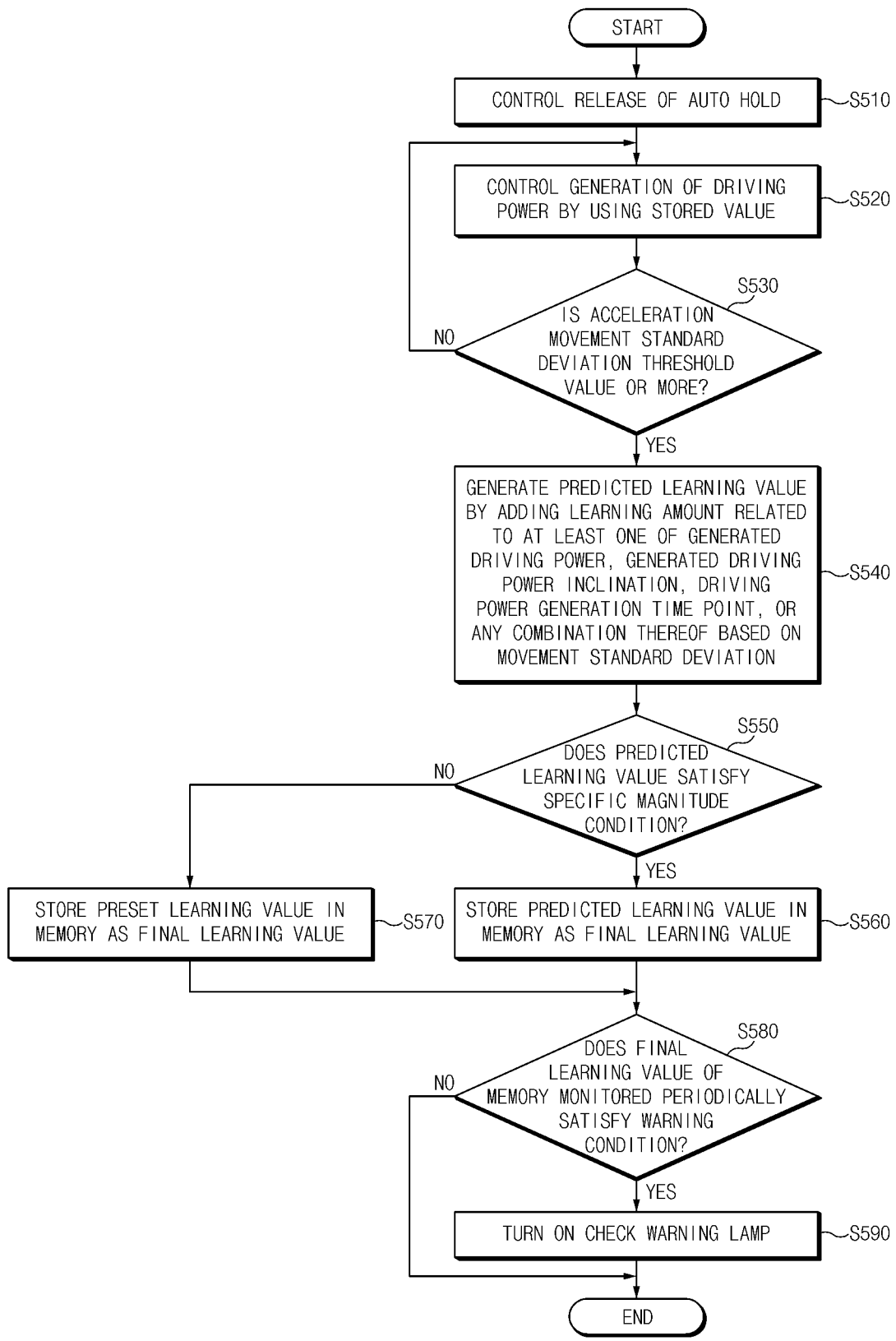
FIG. 5 is a flowchart of operations of an auto hold control apparatus according to an exemplary embodiment of the present disclosure.

FIG. 5 is a flowchart of operations of the auto hold control apparatus according to an exemplary embodiment of the present disclosure.

According to an exemplary embodiment of the present disclosure, the auto hold control apparatus (e.g., the auto hold control apparatus 100 of FIG. 1) may perform the operations included in FIG. 5. For example, at least some of the components (e.g., the controller 110, the memory 120, the driver 130, and/or the display 140) included in the auto hold control apparatus may be configured to perform the operations of FIG. 5.

Hereinafter, in the exemplary embodiment of the present disclosure, operations of S510 to S590 may be sequentially performed, but may not be performed necessarily sequentially. For example, the sequence of the operations may be changed, and at least two of the operations may be performed in parallel. Furthermore, the contents that correspond to or the same as the contents described above in relation to FIG. 5 will be described briefly or omitted.

According to an exemplary embodiment of the present disclosure, the auto hold control apparatus may perform an auto hold releasing control (S510).

For example, the auto hold control apparatus may perform the auto hold releasing function when receiving an input (e.g., a pressure input to the accelerator pedal) related to the acceleration of the vehicle while the auto hold function of the vehicle is performed.

According to an exemplary embodiment of the present disclosure, the auto hold control apparatus may perform control of generation of the driving power by use of a value which is stored in advance (S520).

For example, the auto hold control apparatus may control generation of the driving power based on the learning value for setting at least one parameter related to the driving power stored in advance in the memory.

For example, the control of the generation of the driving power may include control of a decrease in the braking force and control of an increase in the driving power.

According to an exemplary embodiment of the present disclosure, the auto hold control apparatus may be configured to determine whether the acceleration movement standard deviation is a threshold value or more than the threshold value (S530).

For example, a description of the operation of the auto hold control apparatus for determining the acceleration movement standard deviation may be replaced by the above description of FIG. 3.

For example, when the acceleration movement standard deviation is the threshold value or more (e.g., S530—Yes), the auto hold control apparatus may perform operation S540.

For example, when the acceleration movement standard deviation is the threshold value or more (e.g., S530—No), the auto hold control apparatus may repeatedly perform operation S520.

According to an exemplary embodiment of the present disclosure, the auto hold control apparatus may be configured to generate a predicted learning value by adding a learning amount related to at least one of the generated driving power, the generated driving power inclination, the driving power generation time point, or any combination thereof to the learning value stored in advance in the memory, based on the movement standard deviation (S540).

For example, the learning value stored in advance in the memory may include a first initial learning amount (e.g., the initially generated driving power learning amount and the initially generated driving power inclination learning amount) for changing the generated driving power and the generated driving power inclination, and a second initial learning amount (e.g., initial driving power generation time point learning amount) for changing the driving power generation time point.

For example, the auto hold control apparatus may be configured to generate the first learning amount by generating the learning amount related to the generated driving power and/or the generated driving power inclination based on the magnitude of the movement standard deviation and adding it to the first initial learning amount.

For example, the auto hold control apparatus may be configured to generate the second learning amount by generating the learning amount related to the driving power generation time point based on the magnitude of the movement standard deviation and adding it to the second initial learning amount.

For example, the auto hold control apparatus may be configured to generate the predicted learning value including the first learning amount and the second learning amount.

According to an exemplary embodiment of the present disclosure, the auto hold control apparatus may be configured to determine whether the predicted learning value satisfies a specific magnitude condition (S550).

For example, the auto hold control apparatus may be configured to determine that the predicted learning value satisfies a specific magnitude condition when the first learning amount included in the predicted learning value is a predetermined minimum value or more than the predetermined minimum value.

For example, the auto hold control apparatus may be configured to determine that the predicted learning value satisfies a specific magnitude condition when the second learning amount included in the predicted learning value is less than the specific maximum value.

For example, the auto hold control apparatus may be configured to determine that the predicted learning value does not satisfy a specific magnitude condition when the first learning amount included in the predicted learning value is less than the specific minimum value.

For example, the auto hold control apparatus may be configured to determine that the predicted learning value does not satisfy a specific magnitude condition when the second learning amount included in the predicted learning value is the specific maximum value or more.

For example, the auto hold control apparatus may perform operation S560 when the predicted learning value satisfies the specific magnitude condition (e.g., operation S550—Yes).

For example, the auto hold control apparatus may perform operation S570 when the predicted learning value does not satisfy the specific magnitude condition (e.g., operation S550—No).

According to an exemplary embodiment of the present disclosure, the auto hold control apparatus may store the predicted learning value in the memory as a final learning value (S560).

For example, the auto hold control apparatus may set the predicted learning value including the first learning amount and the second learning amount generated in operation S540 as the final learning value and may store it in the memory.

According to an exemplary embodiment of the present disclosure, the auto hold control apparatus may store the preset learning value in the memory as the final learning value (S570).

For example, the auto hold control apparatus may change the first learning amount included in the predicted learning value to a preset learning value (e.g., a specific minimum value), set it as the final learning value, and store it in the memory when the first learning amount does not satisfy a specific magnitude condition.

For example, the auto hold control apparatus may change the second learning amount included in the predicted learning value to a preset learning value (e.g., a specific maximum value), set it as the final learning value, and store it in the memory when the second learning amount does not satisfy the magnitude condition.

According to an exemplary embodiment of the present disclosure, the auto hold control apparatus may periodically monitor the final learning value and determine whether the final value satisfies a warning condition (S580).

For example, the warning condition may include whether the final learning value is more than a predetermined limit value.

As an exemplary embodiment of the present disclosure, the warning condition may include whether the learning amount related to the generated driving power, the generated driving power inclination, and the driving power generation time point, which are included in the final learning value, or any combination thereof is more than a predetermined limit value.

In other words, the auto hold control apparatus may identify that there occurs a problem in at least one component of the vehicle when the final learning value stored in the memory is more than the predetermined limit value.

For example, the auto hold control apparatus may perform operation S590 when the final learning value satisfies the warning condition (e.g., operation S580—Yes).

For example, the auto hold control apparatus may end the operation when the final learning value does not satisfy the warning condition (e.g., operation S580—No).

According to an exemplary embodiment of the present disclosure, the auto hold control apparatus may turn on a check warning lamp (S590).

For example, the auto hold control apparatus may display operation information of the auto hold control apparatus through the display. As an exemplary embodiment of the present disclosure, the operation information may include information on at least one of an error, a breakdown, a degradation, or any combination of at least some of the components of the auto hold control apparatus 100.

Figure 6:
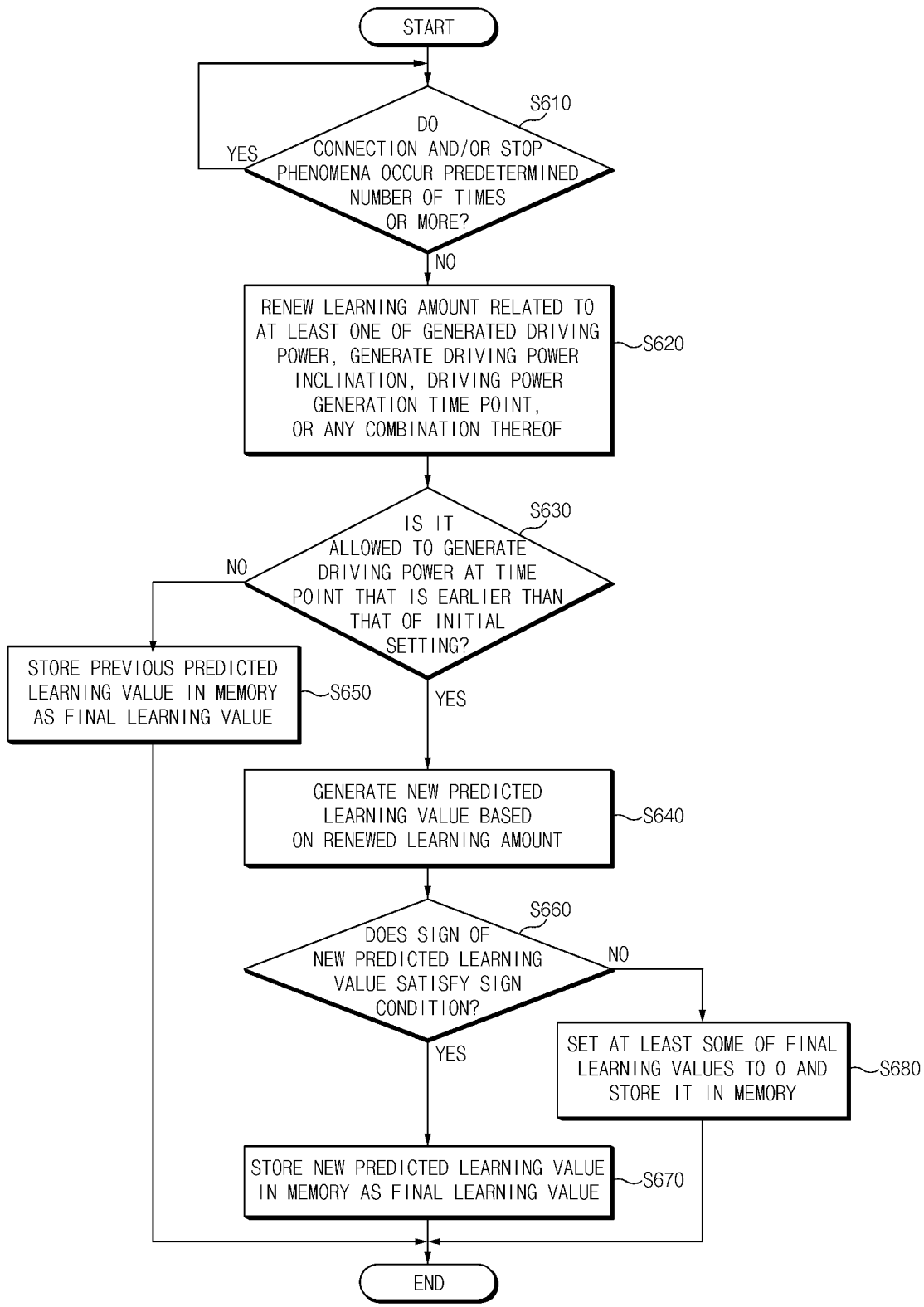
FIG. 6 is a flowchart of operations of an auto hold control apparatus according to an exemplary embodiment of the present disclosure.

FIG. 6 is a flowchart of operations of the auto hold control apparatus according to an exemplary embodiment of the present disclosure.

According to an exemplary embodiment of the present disclosure, the auto hold control apparatus (e.g., the auto hold control apparatus 100 of FIG. 1) may perform the operations included in FIG. 6. For example, at least some of the components (e.g., the controller 110, the memory 120, the driver 130, and/or the display 140) included in the auto hold control apparatus may be configured to perform the operations of FIG. 6.

Hereinafter, in the exemplary embodiment of the present disclosure, operations of S610 to S680 may be sequentially performed, but may not be performed necessarily sequentially. For example, the sequence of the operations may be changed, and at least two of the operations may be performed in parallel. Furthermore, the contents that correspond to or the same as the contents described above in relation to FIG. 6 will be described briefly or omitted.

According to an exemplary embodiment of the present disclosure, the auto hold control apparatus may identify whether connection and/or stop phenomena occurs by a predetermined number of times or more (S610).

For example, the auto hold control apparatus may count the number of times, by which the problems, such as connections and/or stops, occur while operations of activating and deactivating the auto hold function are repeatedly performed. In other words, the auto hold control apparatus may be configured to determine whether the situations, in which at least one learning amount regarding the driving power needs to be renewed, occur the predetermined number of times or more.

For example, the auto hold control apparatus may be configured to determine whether the connection and/or stop phenomena occur by a predetermined number of times or more the predetermined number of times, by determining whether the movement standard deviation of the acceleration corresponds to the threshold value or more continuously by a preset number of times or more while the auto hold function of the vehicle is controlled based on the final learning value stored in the memory.

For example, when it is determined that the connection and/or stop phenomena occur by a predetermined number of times or more (e.g., operation S610—Yes), the auto hold control apparatus may repeatedly perform operation S610.

For example, when it is determined that the connection and/or stop phenomena does not occur by a predetermined number of times or more (e.g., operation S610—No), the auto hold control apparatus may perform operation S620.

According to an exemplary embodiment of the present disclosure, the auto hold control apparatus may renew the learning amount related to at least one of the generated driving power, the generated driving power inclination, the driving power generation time point, or any combination thereof (S620).

For example, the auto hold control apparatus may be configured to generate a corrected learning amount by adding a specific compensation value to at least one learning amount included in the final learning value.

For example, the controller 110 may be configured to generate the corrected first learning amount by adding a specific first compensation value to the first learning amount related to at least one of the generated driving power, the generated driving power inclination, or any combination thereof.

As an exemplary embodiment of the present disclosure, the auto hold control apparatus may be configured to generate a corrected second learning amount by subtracting a specific second compensation value from a second learning amount related to the driving power generation time point.

According to an exemplary embodiment of the present disclosure, the auto hold control apparatus may be configured to determine whether it is allowed that the driving power is generated at a time point which is earlier than that of the initial setting (S630).

For example, the auto hold control apparatus may be configured to determine whether it is allowed to move up the driving power generation time point or increase the generated driving power and/or the generated driving power inclination according to the learning amount generated in operation S620.

For example, the auto hold control apparatus may be configured to determine whether it is allowed to control generation of the driving power according to the learning amount generated in operation S620, based on at least one of a setting condition by the user, a setting condition set in an operation of producing the vehicle, or any combination thereof.

For example, the auto hold control apparatus may perform operation S640 when it is allowed to generate the driving power at a time point which is earlier than that of the initial setting (e.g., operation S630—Yes).

For example, the auto hold control apparatus may perform operation S650 when the final learning value does not satisfy the warning condition (e.g., operation S630—No).

According to an exemplary embodiment of the present disclosure, the auto hold control apparatus may be configured to generate a new predicted learning value, based on the renewed learning amount (S640).

For example, the auto hold control apparatus may be configured to generate a new predicted learning value including the at least one learning amount generated in operation S620.

As an exemplary embodiment of the present disclosure, the new predicted learning value may include a corrected first learning amount and/or a corrected second learning amount.

According to an exemplary embodiment of the present disclosure, the auto hold control apparatus may store the previous predicted learning value in the memory as the final learning value (S650).

For example, the auto hold control apparatus may be configured to determine that it is not allowed to generate the driving power at a time point which is earlier than that of the initial setting and/or control of release of the auto hold that increase the generated driving power or increase the generated inclination further than that of the initial setting, and may set the previous predicted learning value (or the stored final learning value) as the final learning value and store it in the memory.

According to an exemplary embodiment of the present disclosure, the auto hold control apparatus may be configured to determine whether a sign of the new predicted learning value satisfies a specific sign condition (S660).

For example, when the corrected first learning amount included in the new predicted learning value is a negative number and the corrected second learning amount is a positive number, the auto hold control apparatus may be configured to determine that the sign of the new predicted learning value satisfies a specific sign condition.

For example, the auto hold control apparatus may perform operation S670 when the sign of the new predicted learning value satisfies the specific sign condition (e.g., operation S660—Yes).

For example, the auto hold control apparatus may perform operation S680 when the final learning value does not satisfy the warning condition (e.g., operation S660—No).

According to an exemplary embodiment of the present disclosure, the auto hold control apparatus may set the new predicted learning value as the final learning value and store it in the memory (S670).

For example, the auto hold control apparatus may set the new predicted learning value including the corrected first learning amount and the corrected second learning amount as the final learning value and may store it in the memory.

According to an exemplary embodiment of the present disclosure, the auto hold control apparatus may set some of the final learning values to 0 and store it in the memory (S680).

As an exemplary embodiment of the present disclosure, when the corrected first learning amount is a positive number, the auto hold control apparatus may set (initialize) a first final learning amount related to one of the generated driving power and the generated driving power inclination, which are included in the final learning value, or any combination thereof, to 0 and may store it in the memory.

As an exemplary embodiment of the present disclosure, the auto hold control apparatus may set (initialize) a second final learning amount related to the driving power generation time point included in the final learning value to 0 and store it in the memory when the corrected second learning amount is a negative number.

Figure 7:
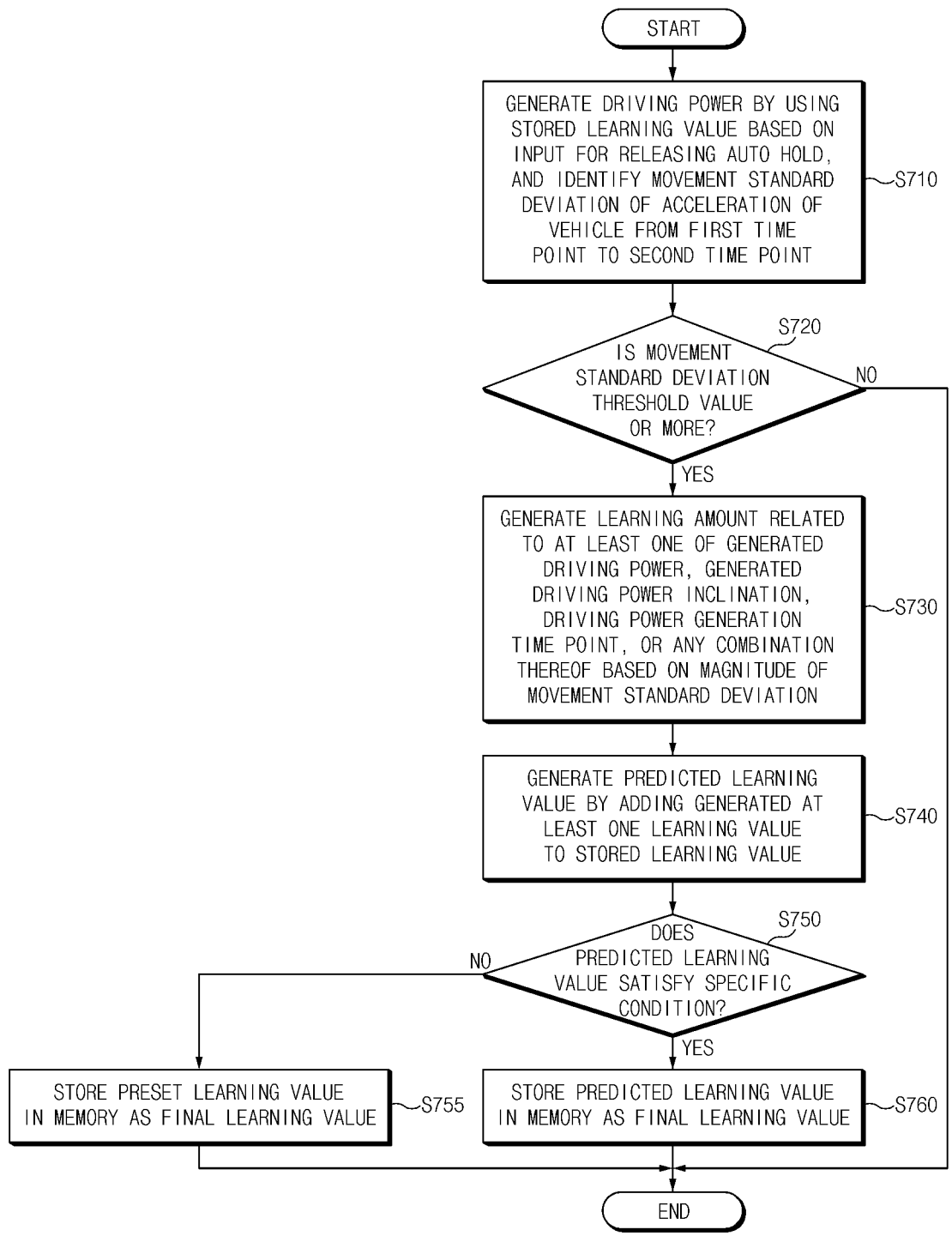
FIG. 7 is a flowchart of operations of an auto hold control apparatus according to an exemplary embodiment of the present disclosure.

FIG. 7 is a flowchart of operations of the auto hold control apparatus according to an exemplary embodiment of the present disclosure.

According to an exemplary embodiment of the present disclosure, the auto hold control apparatus (e.g., the auto hold control apparatus 100 of FIG. 1) may perform the operations included in FIG. 7. For example, at least some of the components (e.g., the controller 110, the memory 120, the driver 130, and/or the display 140) included in the auto hold control apparatus may be configured to perform the operations of FIG. 7.

Hereinafter, in the exemplary embodiment of the present disclosure, operations of S710 to S760 may be sequentially performed, but may not be performed necessarily sequentially. For example, the sequence of the operations may be changed, and at least two of the operations may be performed in parallel. Furthermore, the contents that correspond to or the same as the contents described above in relation to FIG. 7 will be described briefly or omitted.

According to an exemplary embodiment of the present disclosure, the auto hold control apparatus may be configured to generate the driving power by use of the stored learning value based on an input for releasing the auto hold, and may identify a moving average deviation (or a movement standard deviation) of the accelerations of the vehicle, which are generated from the first time point to the second time point (S710).

For example, the auto hold control apparatus may obtain a driving signal (e.g., a signal obtained based on the pressure input to the accelerator pedal) for releasing the auto hold of the vehicle through the driver, and may be configured to generate the driving power through the driver, based on the driving signal.

For example, the auto hold control apparatus may be configured to determine the movement standard deviation of the accelerations generated by the driving power from the first time point to the second time point.

According to an exemplary embodiment of the present disclosure, the auto hold control apparatus may be configured to determine whether the movement standard deviation is a threshold value or more than the threshold value (S720).

For example, when the movement standard deviation is the threshold value or more (e.g., S720—Yes), the auto hold control apparatus may perform operation S730.

For example, when the movement standard deviation is less than the threshold value (e.g., S720—No), the auto hold control apparatus may end the operation.

According to an exemplary embodiment of the present disclosure, the auto hold control apparatus may be configured to generate at least one learning amount related to at least one of the generated driving power, the generated driving power inclination, the driving power generation time point, and any combination thereof, based on the magnitude of the movement standard deviation (S730).

For example, the auto hold control apparatus may be configured to generate at least one learning amount for decreasing the generated driving power and/or the generated driving power inclination in inverse proportion to the magnitude of the movement standard deviation.

For example, the auto hold control apparatus may be configured to generate at least one learning amount for delaying the driving power generation time point in proportion to the magnitude of the movement standard deviation.

According to an exemplary embodiment of the present disclosure, the auto hold control apparatus may be configured to generate a predicted learning value by adding at least one learning amount to the learning value stored in advance (S740).

For example, the learning value stored in advance in the memory may include a first initial learning amount (e.g., the initially generated driving power learning amount and the initially generated driving power inclination learning amount) for changing the generated driving power and the generated driving power inclination, and a second initial learning amount (e.g., initial driving power generation time point learning amount) for changing the driving power generation time point.

For example, the auto hold control apparatus may be configured to generate the first learning amount by adding the at least one learning amount related to the generated driving power and/or the generated driving power inclination based on the magnitude of the movement standard deviation, which is generated in operation S730 to the first initial learning amount.

For example, the auto hold control apparatus may be configured to generate the second learning amount by adding the generated at least one learning amount related to the driving power generation time point based on the magnitude of the movement standard deviation to the second initial learning amount.

For example, the auto hold control apparatus may be configured to generate the predicted learning value including the first learning amount and the second learning amount.

According to an exemplary embodiment of the present disclosure, the auto hold control apparatus may be configured to determine whether the predicted learning value satisfies a specific condition (S750).

For example, the auto hold control apparatus may be configured to determine that the predicted learning value satisfies a specific condition when the first learning amount included in the predicted learning value is a predetermined minimum value or more than the predetermined minimum value and the second learning amount is less than a maximum value.

For example, the auto hold control apparatus may be configured to determine that the predicted learning value does not satisfy a specific magnitude condition when the first learning amount included in the predicted learning value is less than the specific minimum value or the second learning amount is the specific maximum value or more.

For example, the auto hold control apparatus may perform operation S760 when the predicted learning value satisfies the specific magnitude condition (e.g., operation S750—Yes).

For example, the auto hold control apparatus may perform operation S755 when the predicted learning value does not satisfy the specific magnitude condition (e.g., operation S750—No).

According to an exemplary embodiment of the present disclosure, the auto hold control apparatus may store the predicted learning value in the memory as a final learning value (S760).

For example, the auto hold control apparatus may set the predicted learning value including the first learning amount and the second learning amount generated in operation S740 as the final learning value and may store it in the memory.

According to an exemplary embodiment of the present disclosure, the auto hold control apparatus may store the preset learning value in the memory as the final learning value (S755).

For example, the auto hold control apparatus may change the first learning amount included in the predicted learning value to a preset learning value (e.g., a specific minimum value), set it as the final learning value, and store it in the memory.

For example, the auto hold control apparatus may change the second learning amount included in the predicted learning value to a preset learning value (e.g., a specific maximum value), set it as the final learning value, and store it in the memory when the second learning amount does not satisfy the magnitude condition.

According to an exemplary embodiment of the present disclosure, the auto hold control apparatus may additionally perform the operation of FIG. 6 after performing the operation of FIG. 7. The description of the operation of FIG. 6 may replace the above description of FIG. 6.

Figure 8:
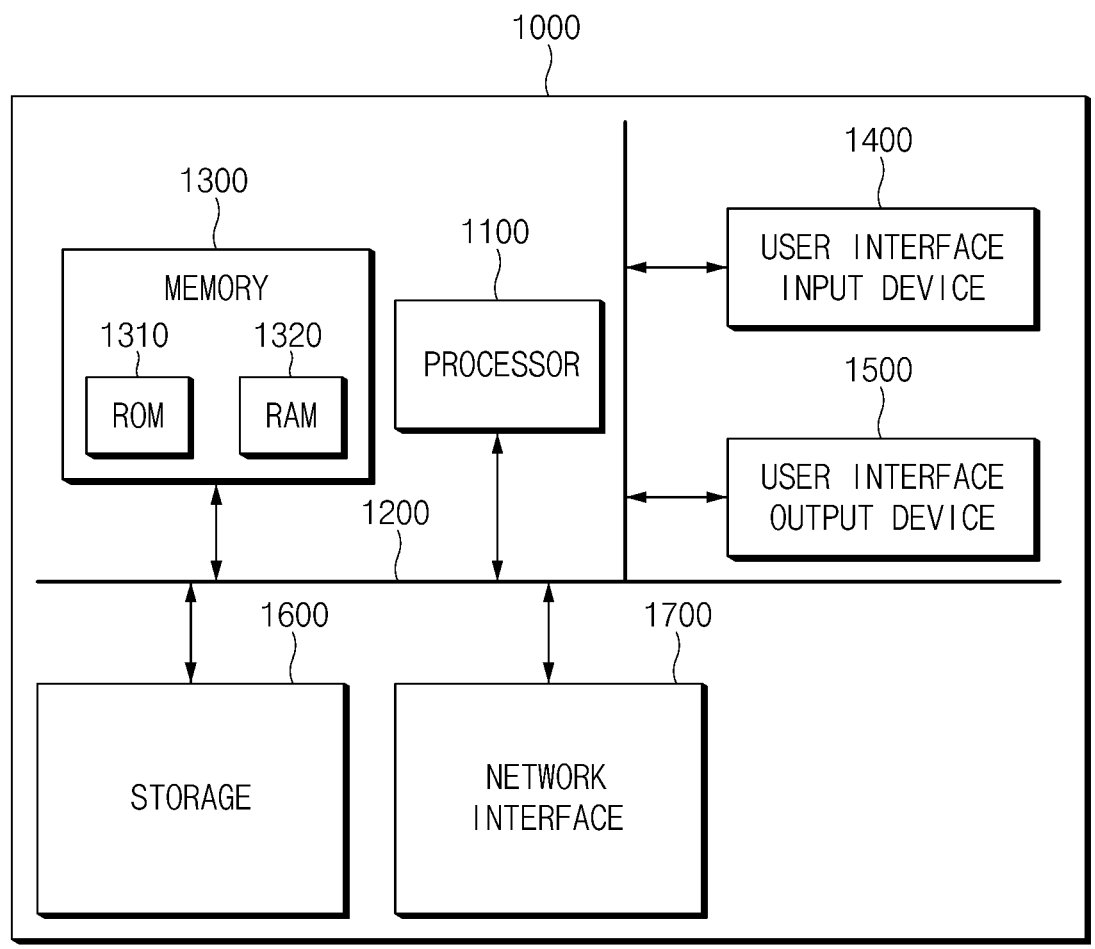
FIG. 8 illustrates a computing system related to an auto hold control method according to an exemplary embodiment of the present disclosure.

FIG. 8 illustrates a computing system related to an auto hold control method according to an exemplary embodiment of the present disclosure.

Referring to FIG. 8, a computing system 1000 related to the auto hold control method may include at least one processor 1100, a memory 1300, a user interface input device 1400, a user interface output device 1500, storage 1600, and a network interface 1700, which are connected through a bus 1200.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The effects of the auto hold control apparatus and the auto hold control method according to an exemplary embodiment of the present disclosure will be referred to as follows.

According to at least one of the exemplary embodiments of the present disclosure, a stop feeling and/or a connection problem that occurs due to a control of the auto hold may be solved by identifying the acceleration movement standard deviation by use of at least one sensor and adaptively changing the learning value related to the driving power based on an identification result.

Furthermore, according to at least one of the exemplary embodiments of the present disclosure, an accident may be prevented in advance by determining a breakdown of at least some of the components of the vehicle in a process of generating the learning value and visually displaying a timing of check and exchange of the components to the user.

Furthermore, according to at least one of the exemplary embodiments of the present disclosure, because an additional component for controlling the auto hold is not necessary, a use performance may be efficiently enhanced in aspects of productivity and costs.

Furthermore, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An auto hold control apparatus comprising:
a driver including at least one driving device for driving a vehicle;
a memory configured to store at least one instruction therein; and
a controller operatively connected to the driver and the memory,
wherein the auto hold control apparatus is configured to, when the at least one instruction is executed by the controller:
obtain a driving signal for releasing an auto hold of the vehicle, through the driver;
generate driving power through the driver, based on the obtained driving signal;
determine a movement standard deviation of an acceleration generated by the driving power from a first time point to a second time point;
generate at least one learning amount related to at least one of the generated driving power, a generated driving power inclination, a driving power generation time point, or a combination thereof, based on a magnitude of the movement standard deviation, when the movement standard deviation is a threshold value or more than the threshold value;
generate a predicted learning value by adding the at least one learning amount to a learning value which is stored in the memory in advance; and
store the predicted learning value in the memory as a final learning value when the predicted learning value satisfies a predetermined condition.

2. The auto hold control apparatus of claim 1, wherein the auto hold control apparatus is further configured to, when the at least one instruction is executed by the controller:
store a preset learning value in the memory as the final learning value when the predicted learning value does not satisfy the predetermined condition.

3. The auto hold control apparatus of claim 1, wherein the auto hold control apparatus is further configured to, when the at least one instruction is executed by the controller:
generate the at least one learning amount for decreasing at least one of the generated driving power, the generated driving power inclination, or a combination thereof so that the at least one learning amount is inversely proportional to the magnitude of the movement standard deviation when the movement standard deviation is the threshold value or more than the threshold value; and
generate the predicted learning value including a first learning amount generated by adding the at least one learning amount to at least one of an initially generated driving power learning amount, an initially generated driving power inclination learning amount, or a combination thereof.

4. The auto hold control apparatus of claim 3, wherein the auto hold control apparatus is further configured to, when the at least one instruction is executed by the controller:
store the predicted learning value including the first learning amount in the memory as the final learning value when the first learning amount is a predetermined minimum value or more than the predetermined minimum value; and
change the first learning amount included in the predicted learning value to the predetermined minimum value and then store the first learning amount in the memory as the final learning value when the first learning amount is less than the predetermined minimum value.

5. The auto hold control apparatus of claim 1, wherein the auto hold control apparatus is further configured to, when the at least one instruction is executed by the controller:
generate the at least one learning amount for delaying the driving power generation time point so that the at least one learning amount is proportional to the magnitude of the movement standard deviation when the movement standard deviation is the threshold value or more than the threshold value; and
generate the predicted learning value including a second learning amount generated by adding the at least one learning amount to an initial driving power generation time point learning amount included in the learning value which is stored in advance.

6. The auto hold control apparatus of claim 5, wherein the auto hold control apparatus is further configured to, when the at least one instruction is executed by the controller:
store the predicted learning value including the second learning amount in the memory as the final learning value when the second learning amount is less than a predetermined maximum value; and
change the second learning amount included in the predicted learning value to the predetermined maximum value and then store the second learning amount in the memory as the final learning value when the second learning amount is the predetermined maximum value or more than the predetermined maximum value.

7. The auto hold control apparatus of claim 1, wherein the auto hold control apparatus is further configured to, when the at least one instruction is executed by the controller:
monitor the movement standard deviation while controlling an auto hold function of the vehicle based on the final learning value;
when the auto hold control apparatus identifies that the movement standard deviation corresponds to the threshold value or less than the threshold value continuously by a predetermined number of times or more the predetermined number of times,
generate a corrected first learning amount by adding a predetermined first compensation value to a first learning amount related to at least one of the generated driving power, the generated driving power inclination, or a combination thereof, and
generate a corrected second learning amount by subtracting a predetermined second compensation value from a second learning amount related to the driving power generation time point.

8. The auto hold control apparatus of claim 7, wherein the auto hold control apparatus is further configured to, when the at least one instruction is executed by the controller:
initialize a first final learning amount related to one of the generated driving power, the generated driving power inclination, or a combination thereof included in the final learning value and store the initialized first final learning amount in the memory when the corrected first learning amount is a positive number.

9. The auto hold control apparatus of claim 7, wherein the auto hold control apparatus is further configured to, when the at least one instruction is executed by the controller:
initialize a second final learning amount related to the driving power generation time point included in the final learning value and store the initialized second final learning amount in the memory when the corrected second learning amount is a negative number.

10. The auto hold control apparatus of claim 1, further including:
a display,
wherein the auto hold control apparatus is further configured to, when the at least one instruction is executed by the controller:
monitor the final learning value, based on a predetermined period; and
display operation information of the auto hold control apparatus on the display when the auto hold control apparatus identifies in a monitoring result that the final learning value satisfies a warning condition, and
wherein the warning condition includes whether the final learning value is more than a predetermined limit value.

11. An auto hold control method comprising:
obtaining, by a controller, a driving signal for releasing an auto hold of a vehicle through a driver;
generating, by the controller, driving power through the driver, based on the driving signal;
determining, by the controller, a movement standard deviation of an acceleration generated by the driving power from a first time point to a second time point;
generating, by the controller, at least one learning amount related to at least one of the generated driving power, a generated driving power inclination, a driving power generation time point, or a combination thereof, based on a magnitude of the movement standard deviation, when the movement standard deviation is a threshold value or more than the threshold value;
generating, by the controller, a predicted learning value by adding the at least one learning amount to a learning value which is stored in a memory in advance; and storing, by the controller, the predicted learning value in the memory as a final learning value, when the predicted learning value satisfies a predetermined condition.

12. The auto hold control method of claim 11, wherein the storing of the predicted learning value in the memory as the final learning value, when the predicted learning value satisfies the predetermined condition, by the controller includes:
storing, by the controller, a preset learning value in the memory as the final learning value, when the predicted learning value does not satisfy the predetermined condition.

13. The auto hold control method of claim 11, wherein the generating of the predicted learning value by adding the at least one learning amount to the learning value which is stored in the memory in advance, by the controller includes:
generating, by the controller, the at least one learning amount for decreasing at least one of the generated driving power, the generated driving power inclination, or a combination thereof so that the at least one learning amount is inversely proportional to the magnitude of the movement standard deviation when the movement standard deviation is the threshold value or more than the threshold value; and
generating, by the controller, the predicted learning value including a first learning amount generated by adding the at least one learning amount to at least one of an initially generated driving power learning amount, an initially generated driving power inclination learning amount, or a combination thereof.

14. The auto hold control method of claim 13, wherein the storing of the predicted learning value in the memory as the final learning value, when the predicted learning value satisfies the predetermined condition, by the controller includes:
storing, by the controller, the predicted learning value including the first learning amount in the memory as the final learning value when the first learning amount is a predetermined minimum value or more than the predetermined minimum value; and
changing, by the controller, the first learning amount included in the predicted learning value to the predetermined minimum value and then store the first learning amount in the memory as the final learning value when the first learning amount is less than the predetermined minimum value.

15. The auto hold control method of claim 11, wherein the generating of the predicted learning value by adding the at least one learning amount to the learning value which is stored in the memory in advance, by the controller includes:
generating, by the controller, the at least one learning amount for delaying the driving power generation time point so that the at least one learning amount is proportional to the magnitude of the movement standard deviation when the movement standard deviation is the threshold value or more than the threshold value; and
generating, by the controller, the predicted learning value including a second learning amount generated by adding the at least one learning amount to an initial driving power generation time point learning amount included in the learning value which is stored in advance.

16. The auto hold control method of claim 15, wherein the storing of the predicted learning value in the memory as the final learning value, when the predicted learning value satisfies the predetermined condition, by the controller includes:
storing, by the controller, the predicted learning value including the second learning amount in the memory as the final learning value when the second learning amount is less than a predetermined maximum value; and
changing, by the controller, the second learning amount included in the predicted learning value to the predetermined maximum value and then storing the second learning amount in the memory as the final learning value when the second learning amount is the predetermined maximum value or more than the predetermined maximum value.

17. The auto hold control method of claim 11, further including:
monitoring, by the controller, the movement standard deviation while controlling an auto hold function of the vehicle based on the final learning value;
when the controller identifies that the movement standard deviation corresponds to the threshold value or less than the threshold value continuously by a predetermined number of times or more the predetermined number of times,
generating, by the controller, a corrected first learning amount by adding a predetermined first compensation value to a first learning amount related to at least one of the generated driving power, the generated driving power inclination, or a combination thereof; and
generate, by the controller, a corrected second learning amount by subtracting a predetermined second compensation value from a second learning amount related to the driving power generation time point.

18. The auto hold control method of claim 17, wherein the generating of the corrected first learning amount, by the controller includes:
initializing, by the controller, a first final learning amount related to one of the generated driving power, the generated driving power inclination, or a combination thereof included in the final learning value and storing the initialized first final learning amount in the memory when the corrected first learning amount is a positive number.

19. The auto hold control method of claim 17, wherein the generating of the corrected second learning amount, by the controller includes:
initializing, by the controller, a second final learning amount related to the driving power generation time point included in the final learning value and storing the initialized second final learning amount in the memory when the corrected second learning amount is a negative number.

20. The auto hold control method of claim 11, further including:
monitoring, by the controller, the final learning value based on a predetermined period; and
displaying, by the controller, operation information of the auto hold control apparatus on a display when the controller identifies in a monitoring result that the final learning value satisfies a warning condition, and
wherein the warning condition includes whether the final learning value is more than a predetermined limit value.

* * * * *